US007009494B2

(12) United States Patent
Kerr et al.

(10) Patent No.: US 7,009,494 B2
(45) Date of Patent: Mar. 7, 2006

(54) MEDIA HOLDER HAVING COMMUNICATION CAPABILITIES

(75) Inventors: Roger S. Kerr, Brockport, NY (US); Timothy J. Tredwell, Fairport, NY (US); Badhri Narayan, Rochester, NY (US); Eric J. Donaldson, St. Paul, MN (US); Sarat K. Mohapatra, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 139 days.

(21) Appl. No.: 10/718,898

(22) Filed: Nov. 21, 2003

(65) Prior Publication Data

US 2005/0110613 A1 May 26, 2005

(51) Int. Cl.
*H04Q 5/22* (2006.01)

(52) U.S. Cl. ................ 340/10.1; 340/573.4; 340/572.1

(58) Field of Classification Search ............... 340/10.1, 340/10.42, 10.5, 10.6, 573.4, 5.61, 572.1, 340/573.1, 5.72; 235/492, 375, 462.25; 707/104.1; 600/300; 607/60, 32

See application file for complete search history.

(56) References Cited

U.S. PATENT DOCUMENTS

| | | | |
|---|---|---|---|
| 3,580,565 | A | 5/1971 | Mallory et al. |
| 3,713,148 | A | 1/1973 | Cardullo et al. |
| 3,835,301 | A | 9/1974 | Barney |
| 4,075,018 | A | 2/1978 | Custer |
| 4,129,855 | A | 12/1978 | Rodrian |
| 4,178,183 | A | 12/1979 | Ciurca, Jr. et al. |
| 4,208,210 | A | 6/1980 | Sakai et al. |
| 4,247,758 | A | 1/1981 | Rodrian |
| 4,270,853 | A | 6/1981 | Hatada et al. |
| 4,270,854 | A | 6/1981 | Stemme et al. |
| 4,275,103 | A | 6/1981 | Tsubusaki et al. |
| 4,394,441 | A | 7/1983 | Kawaguchi et al. |
| 4,416,963 | A | 11/1983 | Takimoto et al. |

(Continued)

FOREIGN PATENT DOCUMENTS

| | | |
|---|---|---|
| JP | 02-164872 | 6/1990 |
| JP | 06-044265 | 7/1992 |
| NL | 9400392 | 3/1994 |
| WO | WO 98/52762 | 11/1998 |

OTHER PUBLICATIONS

TEMIC Semiconductors, E5550-TK5550-Read/Write Transponder, pp. 1-7, www.eurochip.com/tec_server/tag/E5550%20Datasheet.pdf.

(Continued)

*Primary Examiner*—Michael Horabik
*Assistant Examiner*—William Bangachon
(74) *Attorney, Agent, or Firm*—Roland R. Schindler, II

(57) ABSTRACT

A holder for holding at least one image bearing medium, with each at least one image bearing medium having a radio frequency transponder associated therewith, the holder having a holding body to receive and hold at least one image bearing medium an antenna and a radio frequency communication circuit operable to sense a first electromagnetic signal transmitted by the remote reader, generate a second electromagnetic signal in the holding body with the second electromagnetic signal adapted to cause the radio frequency transponders associated with said at least one medium held by the holding body to respond with electromagnetic signals that can be used to identify the mediums within the holding body, wherein the radio frequency communication circuit further transmits electromagnetic signals that can be used to identify the mediums within the holding body to the remote reader.

20 Claims, 4 Drawing Sheets

U.S. PATENT DOCUMENTS

| | | | | | |
|---|---|---|---|---|---|
| 4,418,141 | A | | 11/1983 | Kawaguchi et al. | |
| 4,431,764 | A | | 2/1984 | Yoshizumi | |
| 4,495,276 | A | | 1/1985 | Takimoto et al. | |
| 4,571,361 | A | | 2/1986 | Kawaguchi et al. | |
| 4,600,280 | A | | 7/1986 | Clark | |
| 4,663,625 | A | | 5/1987 | Yewen | |
| 4,742,470 | A | | 5/1988 | Juengel | |
| 4,806,958 | A | | 2/1989 | Momot et al. | |
| 4,855,769 | A | | 8/1989 | Slavitter et al. | |
| 4,880,325 | A | | 11/1989 | Ueda et al. | |
| 4,905,029 | A | | 2/1990 | Kelley | |
| 4,952,913 | A | * | 8/1990 | Pauley et al. | 340/573.4 |
| 4,983,996 | A | | 1/1991 | Kinoshita | |
| 4,990,092 | A | | 2/1991 | Cummings | |
| 4,999,276 | A | | 3/1991 | Kuwabara et al. | |
| 5,008,661 | A | | 4/1991 | Raj | |
| 5,019,815 | A | | 5/1991 | Lemelson et al. | |
| 5,030,544 | A | | 7/1991 | Olbrechts et al. | |
| 5,049,898 | A | | 9/1991 | Arthur et al. | |
| 5,049,904 | A | | 9/1991 | Nakamura et al. | |
| 5,059,126 | A | | 10/1991 | Kimball | |
| 5,078,523 | A | | 1/1992 | McGourty et al. | |
| 5,104,247 | A | | 4/1992 | Ohshima | |
| 5,105,190 | A | | 4/1992 | Kip et al. | |
| 5,122,445 | A | | 6/1992 | Ishigaki | |
| 5,184,152 | A | | 2/1993 | French | |
| 5,185,315 | A | | 2/1993 | Sparer | |
| 5,196,846 | A | | 3/1993 | Brockelsby et al. | |
| 5,196,862 | A | | 3/1993 | Fisher, Sr. | |
| 5,224,784 | A | | 7/1993 | Haftmann et al. | |
| 5,266,968 | A | | 11/1993 | Stephenson | |
| 5,266,975 | A | | 11/1993 | Mochizuki et al. | |
| 5,268,708 | A | | 12/1993 | Harshbarger et al. | |
| 5,290,190 | A | | 3/1994 | McClanahan | |
| 5,294,525 | A | | 3/1994 | Yamauchi et al. | |
| 5,297,881 | A | | 3/1994 | Ishiyama | |
| 5,300,575 | A | | 4/1994 | Jonas et al. | |
| 5,305,020 | A | | 4/1994 | Gibbons et al. | |
| 5,310,999 | A | | 5/1994 | Claus et al. | |
| 5,312,681 | A | | 5/1994 | Muys et al. | |
| 5,313,235 | A | | 5/1994 | Inoue et al. | |
| 5,318,370 | A | | 6/1994 | Nehowig | |
| 5,323,704 | A | | 6/1994 | Fraczek | |
| 5,331,338 | A | | 7/1994 | Mager | |
| 5,340,676 | A | | 8/1994 | Anderson et al. | |
| 5,342,671 | A | | 8/1994 | Stephenson | |
| 5,347,274 | A | | 9/1994 | Hassett | |
| 5,354,613 | A | | 10/1994 | Quintens et al. | |
| 5,365,312 | A | | 11/1994 | Hillmann et al. | |
| 5,368,995 | A | | 11/1994 | Christian et al. | |
| 5,370,981 | A | | 12/1994 | Krafft et al. | |
| 5,372,924 | A | | 12/1994 | Quintens et al. | |
| 5,382,494 | A | | 1/1995 | Kudo et al. | |
| 5,385,416 | A | | 1/1995 | Maekawa et al. | |
| 5,391,472 | A | | 2/1995 | Muys et al. | |
| 5,398,257 | A | | 3/1995 | Groenteman | |
| 5,403,467 | A | | 4/1995 | Jonas et al. | |
| 5,426,011 | A | | 6/1995 | Stephenson | |
| 5,430,441 | A | | 7/1995 | Bickley et al. | |
| 5,443,944 | A | | 8/1995 | Krafft et al. | |
| 5,455,617 | A | | 10/1995 | Stephenson et al. | |
| 5,459,021 | A | | 10/1995 | Ito et al. | |
| 5,466,576 | A | | 11/1995 | Schulz et al. | |
| 5,484,694 | A | | 1/1996 | Lelental et al. | |
| 5,491,327 | A | | 2/1996 | Saroya | |
| 5,491,468 | A | | 2/1996 | Everett et al. | |
| 5,493,385 | A | | 2/1996 | Ng | |
| 5,504,507 | A | | 4/1996 | Watrobski et al. | |
| 5,513,920 | A | | 5/1996 | Whritenor et al. | |
| 5,516,590 | A | | 5/1996 | Olmstead et al. | |
| 5,521,663 | A | | 5/1996 | Norris, III | |
| 5,528,222 | A | | 6/1996 | Moskowitz et al. | |
| 5,528,377 | A | | 6/1996 | Hutcheson | |
| 5,530,702 | A | | 6/1996 | Palmer et al. | |
| 5,532,727 | A | | 7/1996 | Agano et al. | |
| 5,537,920 | A | | 7/1996 | Hasegawa et al. | |
| 5,547,501 | A | | 8/1996 | Maruyama et al. | |
| 5,559,578 | A | | 9/1996 | Umeda et al. | |
| 5,562,352 | A | | 10/1996 | Whritenor et al. | |
| 5,565,906 | A | | 10/1996 | Schoon | |
| 5,574,519 | A | | 11/1996 | Manico et al. | |
| 5,575,898 | A | | 11/1996 | Wolf et al. | |
| 5,584,070 | A | | 12/1996 | Harris et al. | |
| 5,598,201 | A | | 1/1997 | Stodder et al. | |
| 5,600,350 | A | | 2/1997 | Cobbs et al. | |
| 5,600,352 | A | | 2/1997 | Knierim et al. | |
| 5,606,347 | A | | 2/1997 | Simpson | |
| 5,610,635 | A | | 3/1997 | Murray et al. | |
| 5,620,265 | A | | 4/1997 | Kondo | |
| 5,625,391 | A | | 4/1997 | Hirabayashi et al. | |
| 5,644,557 | A | | 7/1997 | Akamine et al. | |
| 5,647,679 | A | | 7/1997 | Green et al. | |
| 5,661,515 | A | | 8/1997 | Hevenor et al. | |
| 5,700,623 | A | | 12/1997 | Anderson et al. | |
| 5,713,288 | A | | 2/1998 | Frazzitta | |
| 5,721,992 | A | | 2/1998 | Chovanes | |
| 5,755,519 | A | | 5/1998 | Klinefelter | |
| 5,757,021 | A | | 5/1998 | Dewaele | |
| 5,757,394 | A | | 5/1998 | Gibson et al. | |
| 5,768,633 | A | | 6/1998 | Allen et al. | |
| 5,774,639 | A | | 6/1998 | Schildkraut et al. | |
| 5,774,752 | A | | 6/1998 | Patton et al. | |
| 5,790,216 | A | | 8/1998 | Inbar et al. | |
| 5,812,156 | A | | 9/1998 | Bullock et al. | |
| 5,842,118 | A | | 11/1998 | Wood, Jr. | |
| 5,850,481 | A | | 12/1998 | Rhoads | |
| 5,875,249 | A | | 2/1999 | Mintzer et al. | |
| 5,912,972 | A | | 6/1999 | Barton | |
| 5,913,088 | A | | 6/1999 | Moghadam et al. | |
| 5,914,671 | A | | 6/1999 | Tuttle | |
| 5,949,885 | A | | 9/1999 | Leighton | |
| 6,008,727 | A | * | 12/1999 | Want et al. | 340/572.1 |
| 6,031,516 | A | | 2/2000 | Leiper | |
| 6,031,914 | A | | 2/2000 | Tewfik et al. | |
| 6,044,156 | A | | 3/2000 | Honsinger et al. | |
| 6,075,950 | A | | 6/2000 | Stephenson | |
| 6,096,491 | A | | 8/2000 | Majumdar et al. | |
| 6,099,178 | A | | 8/2000 | Spurr et al. | |
| 6,106,166 | A | | 8/2000 | Spurr et al. | |
| 6,124,083 | A | | 9/2000 | Majumdar et al. | |
| 6,157,373 | A | | 12/2000 | Rego | |
| 6,173,119 | B1 | | 1/2001 | Manico et al. | |
| 6,208,235 | B1 | * | 3/2001 | Trontelj | 340/10.1 |
| 6,227,643 | B1 | | 5/2001 | Purcell et al. | |
| 6,263,310 | B1 | | 7/2001 | Loudermilk et al. | |
| 6,282,819 | B1 | | 9/2001 | Gu | |
| 6,353,672 | B1 | | 3/2002 | Rhoads | |
| 6,563,425 | B1 | * | 5/2003 | Nicholson et al. | 340/572.7 |
| 6,598,799 | B1 | * | 7/2003 | Jang | 235/462.25 |
| 6,714,133 | B1 | * | 3/2004 | Hum et al. | 340/573.4 |
| 6,720,866 | B1 | * | 4/2004 | Sorrells et al. | 340/10.4 |
| 6,805,667 | B1 | * | 10/2004 | Christopherson et al. | 600/300 |
| 6,850,148 | B1 | * | 2/2005 | Masudaya | 340/5.61 |
| 2002/0101619 | A1 | | 8/2002 | Tsubaki et al. | |

OTHER PUBLICATIONS

TEMIC Semiconductors, e5550-Standard Read/Write Identification IC, Rev. A3, Mar. 17, 1998, pp. 1-11.

HID Corp., Multi-Technology Card Guide, pp. 1, www.hidcorp.com/products.

HID Corp., ProxCard®II, Proximity Access Card, pp. 1-2, www.hidcorp.com/products.

HID Corp., ISO Thin Card, pp. 1-2, www.hidcorp.com/products.
Protective Security Management, HID Prox Cards, pp. 1, www.prosecman.com.au.
Atmel Corp., Atmel Smart Card ICs, 2000, pp. 1-12.
Texas Instruments, Tag-it™—Moving Concepts to Reality, pp. 1-13, 2000.
Texas Instruments, Making RFID work for you: An Industry Rountable hosted by Texas Instruments at NACS-Tech 1998, 2000, pp. 1-15, ww.ti.com/tiris.
Texas Instruments, d'Hont, The Cutting Edge of RFID Technology and Applications for Manufacturing and Distribution, pp. 1-13, www.ti.com/tiris.
Atmel Corp., Atmel Read-Only Transponder—TK5530, Rev. A5, Dec. 19, 2001, pp. 1-10, www.atmel-wm.com.
Philips Semiconductors, mifare Standard Card IC MFI IC S50 Functional Specification, Rev. 5.1, May 2001, pp. 1-19, www.semiconductors.philips.com.
Texas Instruments, Radio Frequency Identification Systems—Access Control, pp. 1-2, www.ti.com/tiris/docs/solutions/solutions.shtml.
Texas Instruments, Michael Knebelkamp, et al., Latest Generation Technology for Immobilizer Systems, www.ti.com/tiris.

* cited by examiner

MEDIA HOLDER HAVING COMMUNICATION CAPABILITIES

CROSS REFERENCE TO RELATED APPLICATIONS

Reference is made to commonly assigned co-pending patent applications Ser. No. 10/161,514 entitled "Virtual Annotation Of A Recording On An Archival Media" filed on Sep. 9, 2002 in the name of Kerr et al, application Ser. No. 10/256,769 entitled "Medium Having Data Storage And Communication Capabilities And Method For Forming Same" filed on Sep. 27, 2002 in the name of Kerr et al., application Ser. No. 10/256,824 entitled "Medium Having Data Storage And Communication Capabilities And Method For Forming Same" filed on Sep. 27, 2002 in the name of Kerr et al. and entitled "Viewing Device" filed on Nov. 19, 2003 in the name of Kerr et al.

FIELD OF THE INVENTION

The invention generally relates to the field of information management and more particularly to the management of information that is recorded on mediums having radio frequency identification devices attached thereto.

BACKGROUND OF THE INVENTION

Information management systems such as Hospital Information Systems (HIS) or Radiology Information Systems (RIS) are used to help facilitate access to and control of medical records of patients who are admitted to hospitals or who are receiving outpatient care. Such medical records can be in a wide variety of forms. Some medical records comprise handwritten notes while automatic billing, monitoring, and/or diagnostic systems make other records. For example, diagnostic images can be generated by various different types of modalities such as Computer Tomography, Ultra Sound, Magnetic Resonance Imaging, Digital Radiography, or Computed Radiography etc. Each type of diagnostic equipment typically records image data in electronic form. These electronic image data are subsequently presented after printing on films and papers for hardcopy. These can also be viewed on displays of various kinds.

At many medical facilities, patient records are ultimately recorded on disparate types of media that are physically gathered into so-called charts or folders that serve as the repository of medical information for each patient. It is vital for effective patient care that such folders contain all of the medical records associated with a patient. It is also vital that such folders contain only medical records that are associated with the patient so that there is a minimal chance of confusion due to mis-matched medical records. Finally it is also important that access to a patient's folder be properly maintained, with appropriate authorization and security measures established to help protect against unauthorized access to the medical records contained in such folders.

Radio frequency identification tags have been proposed for use in a wide range of identification and tracking applications such as passports and credit cards, as is disclosed in U.S. Pat. No. 5,528,222 to Moskowitz et al. One type of commercially available, low profile radio frequency identification tag is the "TAG-IT INLAY"™ RFID tag available from Texas Instruments, Incorporated, located in Dallas, Tex., USA. This component can be used to provide identifying information about an item to which it is attached, for example. Radio frequency identification devices are useful for tracking the location of, characteristics of and usage of documents, books, packages, and other inventory. For example, radio frequency identification tags can be used to track the location of documents and track the chain of custody of such documents within a medium management system. Radio frequency identification tags offer the advantage of small size, enabling these devices to be unobtrusively attached or embedded within an item. Unlike optical or mechanical equivalents, radio frequency identification tags allow communication regardless of orientation relative to a transceiver. When equipped with an on-board read-write memory, these devices can be used for recording and recall of at least some amount of data related to an item to which they are coupled.

Systems employing radio frequency identification tags typically comprise a read/write element, or radio frequency transceiver, that acts as the interface between the radio frequency identification tags and a computer system of some type that uses and/or provides the stored data. In a typical embodiment, the radio frequency identification tag takes the form of a transponder, having an integral antenna, adapted to send and receive electromagnetic fields in cooperation with the transceiver, where the electromagnetic field itself contains information to be conveyed to and from a memory on the radio frequency identification tags. Radio frequency identification tags having both read/write and read-only versions of radio frequency identification tags are available. Information that is stored using a memory in a read/write type of transponder on the radio frequency identification tags can be used to track, identify, and process an item. Such a read-write radio frequency identification tag can also store other information that is to be associated with the item, such as timestamps and identification codes for example.

However, radio frequency tags of the type that are typically associated with a medium such as a diagnostic image or other medical record typically have only a limited range of communication and while they can effectively communicate over a near distance proximate to the radio frequency tag, they cannot send and receive information over convenient distances greater than the near distance. This makes it inconvenient to track the movement of files and folders using conventional radio frequency tag technology.

Thus, it can be seen that there is a need for a means for tracking, and management of medical records that are stored in diagnostic files.

SUMMARY OF THE INVENTION

In a first aspect of the invention a holder is provided for holding at least one medium, with the at least one medium having a radio frequency transponder associated therewith. The holder has a holding body to receive and hold the at least one medium, an antenna and a radio frequency communication circuit operable to sense a first electromagnetic field transmitted remotely by a radio frequency read write device and to generate a second electromagnetic field in the holding body with the second electromagnetic field adapted to cause the at least one radio frequency transponder associated with the at least one medium held by the holding body to respond with at least one third electromagnetic field that can be used to identify the at least one medium within the holding body. The radio frequency communication circuit further transmits a fourth electromagnetic field that can be used to identify the at least one medium within the holding body to the remote radio frequency read write device.

In another aspect of the invention, a medium management system is provided. The medium management system has at least one medium, with each at least one medium having a radio frequency transponder and a holder for holding at least one medium, the holder having a holding body to receive and hold the at least one medium, an antenna; and a radio frequency communication circuit. The radio frequency communication circuit is operable to sense a first electromagnetic field transmitted by a remote radio frequency read write device, generate a second electromagnetic field in the holding body with the second electromagnetic field adapted to cause the radio frequency transponders associated with at least one medium held by the holding body to respond with electromagnetic fields that can be used to identify at least one medium within the holding body, wherein the radio frequency communication circuit further transmits electromagnetic fields that can be used to identify at least one medium within the holding body to the remote radio frequency read write device.

In yet another aspect of the invention, a communication circuit is provided for use in a medium management system for managing a set of mediums each medium having a radio frequency transponder with each transponder capable of communication information over a near distance proximate to the transponder. The communication circuit has an antenna; and a radio frequency transceiver joined to the antenna. The radio frequency transceiver is adapted to generate a polling signal causing radio frequency transponders proximate to the communication circuit to generate a responsive signal containing identifying information, said radio frequency transceiver further adapted to receive responses. The radio frequency transceiver is further adapted to generate an information bearing signal for transmission over a distance that is greater than the near distance said information bearing signal providing information from which the medium management system can identify records proximate to the communication circuit.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present invention is directed in particular to elements forming part of, or cooperating more directly with, an apparatus in accordance with the invention. It is to be understood that elements not specifically shown or described may take various forms well-known to those skilled in the art.

Figure 1:
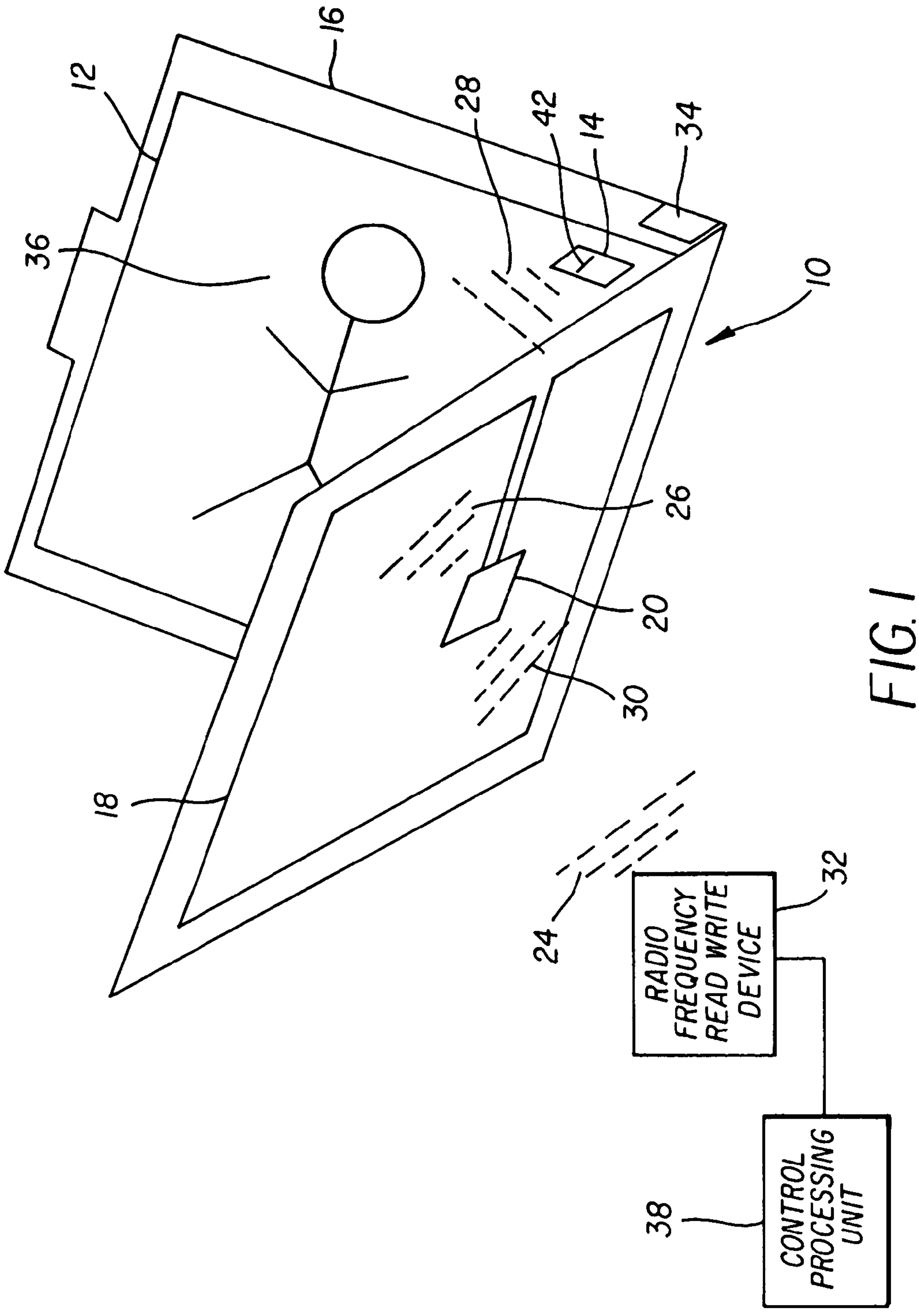
FIG. 1 is a schematic block diagram showing an embodiment of a holder of the present invention.
Figure 2:
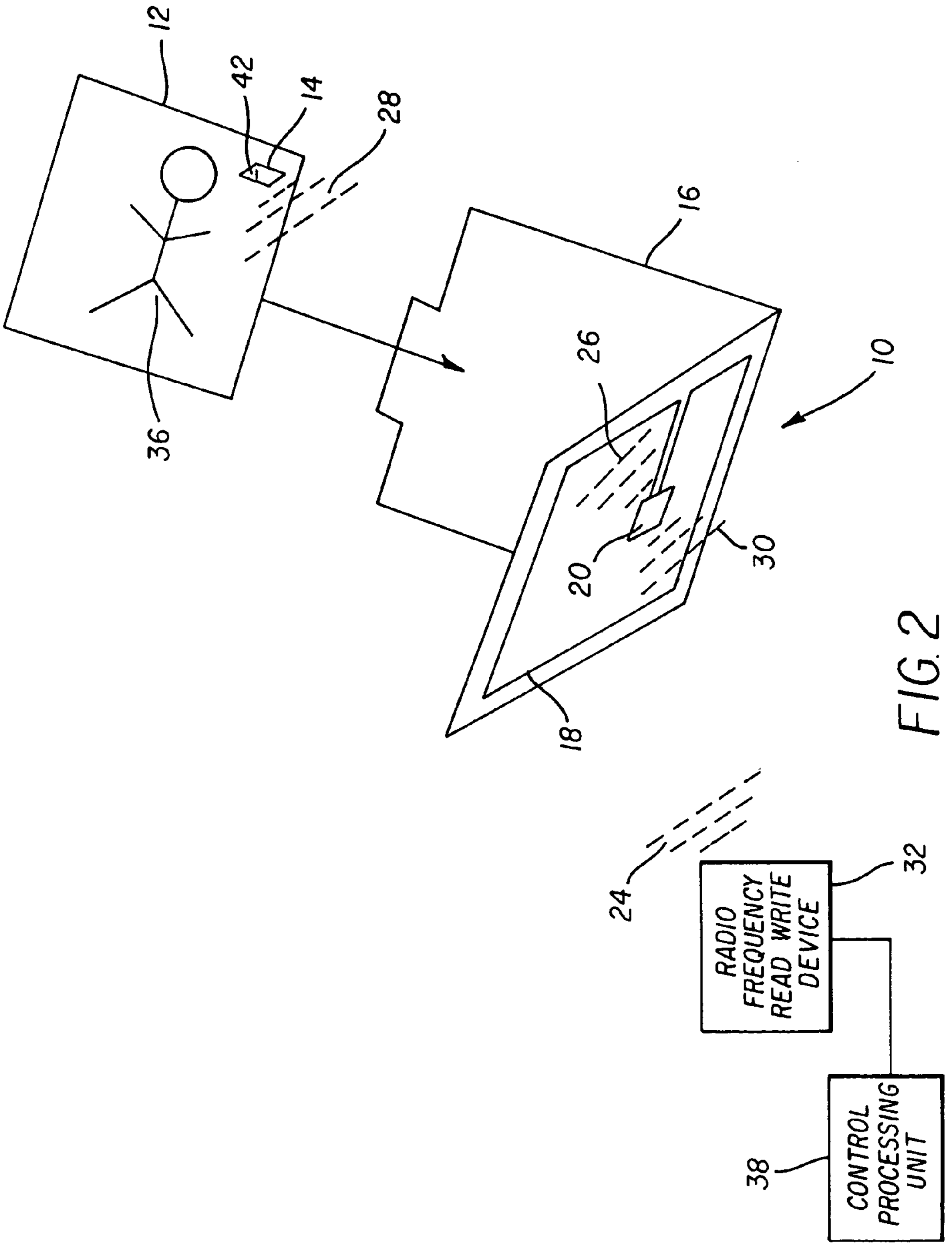
FIG. 2 is another schematic block diagram showing the holder of FIG. 1.

Referring to FIGS. 1 and 2, there is shown an embodiment of a holder 10 for holding at least one medium 12, with each medium 12 having a radio frequency transponder 14 associated therewith. In the embodiment shown in FIGS. 1 and 2, holder 10 has a holding body 16 to receive and hold the at least one medium 12 with patient related content 36 such as an image, text, graphics, handwriting, or other useful patient information recorded thereon. In the embodiment shown, holder 10 is depicted as comprising a conventional folder type structure. However, in other embodiments, holding body 16 can take other forms, such as a binder, clipboard, encasement, envelope, box, or other such structure.

Holder 10 also has an antenna 18 that can be attached to or formed as part of holding body 16 and a radio frequency communication circuit 20 electrically cooperating with antenna 18 and operable to sense a first electromagnetic field 24 transmitted remotely by a radio frequency read/write device 32. Upon sensing the first electromagnetic field 24, radio frequency communication circuit 20 generates a second electromagnetic field 26. The second electromagnetic field 26 is adapted to cause the at least one radio frequency transponder 14 associated with at least one medium 12 held by holding body 16 to respond with a third electromagnetic field 28 that can be used to identify at least one medium 12 within holding body 16. In one embodiment, second electromagnetic field 26 is adapted for transmission over a near distance. The near distance can be, for example, between 1 cm and 50 cm; however the near distance can be any distance that will ensure that any radio frequency transponder 14 of any medium held within holding body 16 will generate a response.

Third electromagnetic field 28 can contain, for example, a distinguishing document number, patient identification, chronological information, a document descriptor, a condensed or digitally compressed version of the content recorded on the medium, or a complete electronic version of the patient content. Typically, radio frequency transponder 14 associated with medium 12 is capable of transmitting the third electromagnetic field 28 over the near distance. Here too, the near distance can be, for example, between 0.1 cm and 50 cm; however the near distance can be any distance that is appropriate for transmission over a distance that is generally within holding body 16.

Radio frequency communication circuit 20 further transmits a fourth electromagnetic field 30 that can be detected at distances that are greater than the near distance and that can be used to identify holder 10 and at least one medium 12 within holding body 16. This signal can include actual information provided by radio frequency transponder 14 associated with mediums in holding body 16. Alternatively, this signal can include other information based upon information provided by radio frequency transponder 14. The fourth signal is received by remote radio frequency read/write device 32 and converted into data that is provided to control processing unit 38. Control processing unit 38 processes this data and uses this data to determine what is stored in holding body 16.

Radio frequency communication circuit 20 can be powered remotely by first electromagnetic field 24. Radio frequency communication circuit 20 can then, in turn, power radio frequency transponder 14 using a second electromagnetic field 26. Radio frequency transponder 14 can also be powered by first electromagnetic field 24. Radio frequency communication circuit 20 may be powered by a power source 34 such as a battery within said holding body 16 which can then provide a signal to power radio frequency transponder 14 using an electromagnetic field 22 (not shown).

Figure 3:
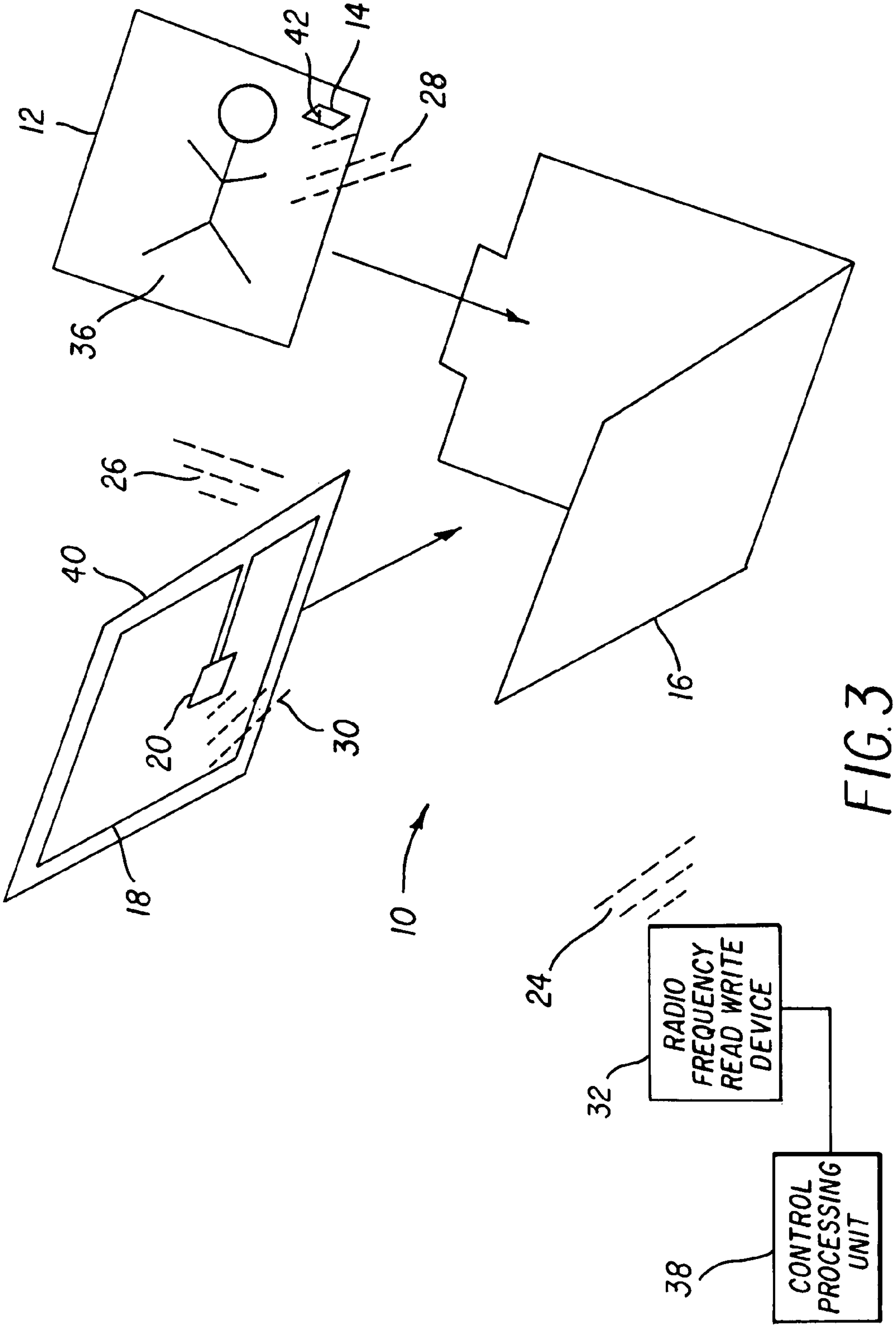
FIG. 3 is a schematic block diagram showing a second embodiment of a holder of the present invention.

FIG. 3 shows an alternate embodiment of holder 10 for holding at least one medium 12 in accordance with the present invention. In this embodiment, holder 10 has a holding body 16 to receive and hold at least one medium 12.

At least one medium 12 has a radio frequency transponder 14 associated therewith and patient related content 36 recorded thereon. Holding body 16 is also adapted to receive and hold a removable communication medium 40 that is inserted into holder 10. Removable communication medium 40 comprises an antenna 18 that can be attached to or formed as part of the communication medium 40, a radio frequency communication circuit 20 operable to sense a first electromagnetic field 24 transmitted remotely by a radio frequency read/write device 32. Upon sensing the first electromagnetic field 24, radio frequency communication circuit 20 generates a second electromagnetic field 26 in holding body 16 with second electromagnetic field 26 adapted to cause the at least one radio frequency transponder 14 associated with at least one medium 12 held by holding body 16 to respond with a third electromagnetic field 28 that can be used to identify at least one medium 12 within holding body 16.

Radio frequency communication circuit 20 further transmits a fourth electromagnetic field 30 that can be used to identify holder 10 and the at least one medium 12 within holding body 16 to the remote radio frequency read/write device 32 that is in communication with control processing unit 38 for processing information obtained from holder 10 and at least one medium 12 held within holding body 16.

Radio frequency communication control circuit 20 has a memory 42 adapted to receive, store and maintain log data of at least one medium 12 held by holding body 16. The log data may also be stored and maintained in the remotely located radio frequency read write device 32. The log data may consist of a listing (not shown) of at least one medium 12 held in holder 10 such that radio frequency communication circuit 20 can compare information identifying at least one medium 12 within holding body 16 against the stored listing 46 of at least one medium 12 to ensure that holder 16 contains a complete set of at least one medium 12 associated with a patient and that holder 16 does not contain any medium 12 that are not associated with the patient who is associated with holding body 16. Optionally, such log data can also be stored in one or more of the radio frequency transponders 14 associated with medium 12 so that medium 12 held by the holding body 16 can separately provide information from which all medical records associated with the patient can be determined.

Figure 4:
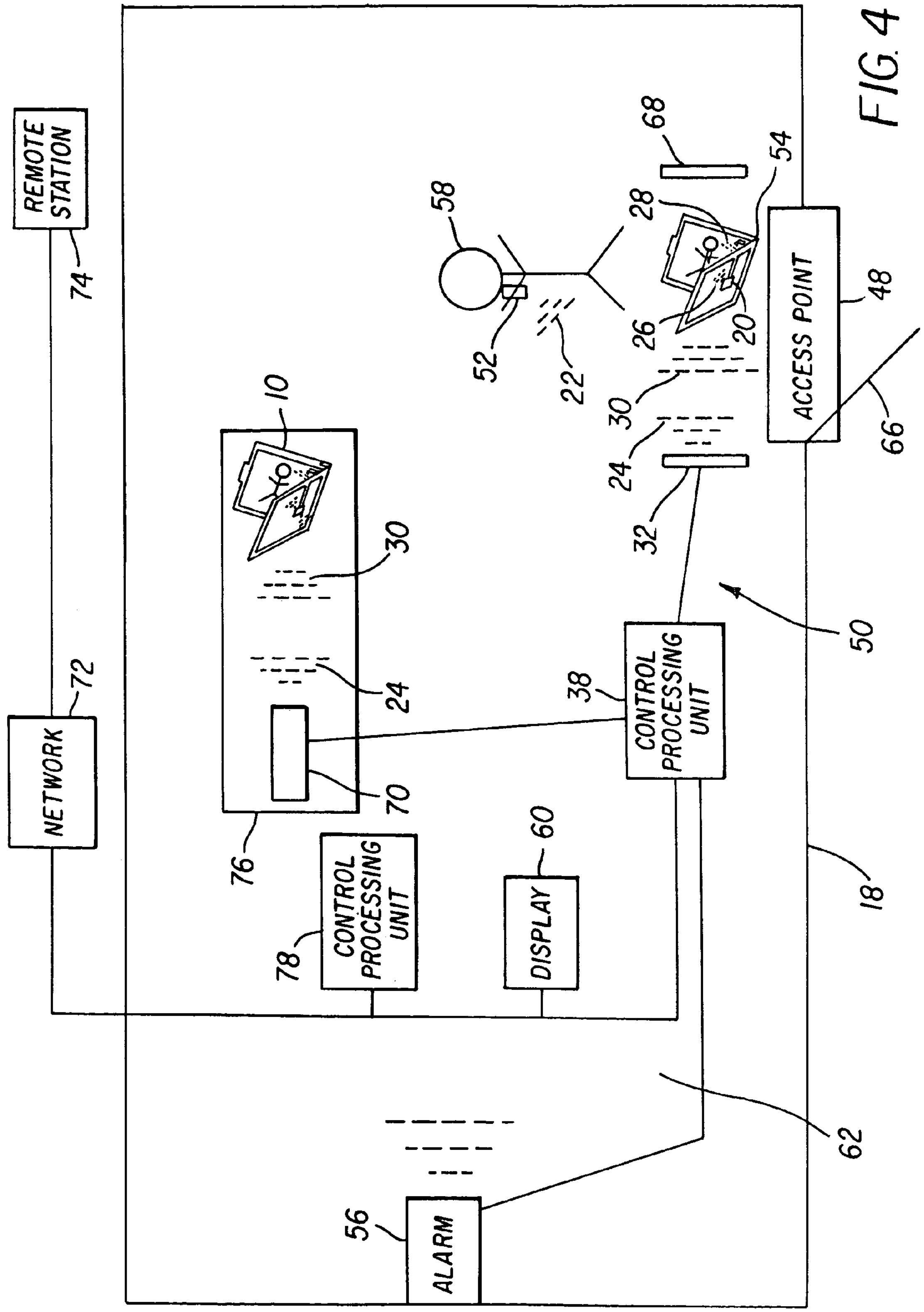
FIG. 4 is a schematic block diagram showing the use of the present invention as part of a larger medium management system.

Referring to FIG. 4, a medium management system 50 is shown. In the embodiment shown, medium management system 50 is adapted for use in a controlled access area 62 having a controlled access point 48 to the controlled access area 62 with an access door 66. A remote radio frequency read/write device 32 is located near the controlled access point 48 that generates a first electromagnetic field 24 to detect and identify holder 10 entering or leaving controlled access area 62. Radio frequency communication circuit 20 is operable to sense first electromagnetic field 24 and to generate a second electromagnetic field 26 in holding body 16. Second electromagnetic field 26 is adapted to cause radio frequency transponders 14 associated with at least one medium 12 held by holding body 16 to respond with a third electromagnetic field 28 to identify at least one medium 12 within holding body 16. Radio frequency communication circuit 20 further transmits a fourth electromagnetic field 30 that can be used to identify the detected holder 54 and at least one medium 12 held by detected holder 54 to the remote radio frequency read/write device 32. An optional remote radio frequency read/write device 68 may be positioned opposite remote radio frequency read/write device 32 to improve electromagnetic fields being sent and received.

As is also shown in FIG. 4, a personal radio frequency identification transponder 52 can be associated with a person 58 entering or leaving the controlled access area 62. At least one holder 10 sends an electromagnetic field 22 that is received by personal radio frequency identification transponder 52. Personal radio frequency identification transponder 52 responds to electromagnetic field 22 with a signal that can be used to identify person 58. A control-processing unit is provided to communicate with the remote radio frequency read/write device 78, second radio frequency read/write device 70, alarm 56 and network 72 to allow the data from at least one holder 10 and person 58 to be stored remotely, to check permissions, to compare log data and/or to determine who has accessed a particular medium 12 in a particular holder 10 or to sound an alarm 56 or report access or removal of holder 10 to a remote station 74 where person 58 does not have permission to access or remove holder 10. Display 60 can be used to view content within holder 10 or holder 10 could be checked for correct content by a radio frequency read write device shown on file holder 76 within a controlled access area 62 as described previously.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10 holder
12 medium
14 radio frequency transponder
16 holding body
18 antenna
20 radio frequency communication circuit
22 electromagnetic field
24 first electromagnetic field
26 second electromagnetic field
28 third electromagnetic field
30 fourth electromagnetic field
32 radio frequency read write device
34 power source
36 patient related content
38 control processing unit
40 communication medium
42 memory
44 log data
46 stored listing
48 access point
50 medium management system
52 radio frequency identification transponder
54 detected holder
56 alarm
58 person
60 display
62 controlled access area
64 enclosed area
66 access door
68 optional radio frequency read write device
70 second radio frequency read write device
72 network
74 remote station
76 file holder
78 control processing unit

What is claimed is:

1. A holder for holding at least one medium bearing medical information, with the at least one medium having a radio frequency transponder associated therewith, the holder comprising:

a holding body to receive and hold the at least one medium bearing medical information;

an antenna; and a radio frequency communication circuit connected to the antenna operable to sense a first electromagnetic field transmitted remotely by a radio frequency read write device, generate a near-distance second electromagnetic field in the holding body with the second electromagnetic field adapted to cause at least one radio frequency transponder associated with the at least one medium held by the holding body to respond with at least one near-distance third electromagnetic field that can be used to identify at least one medium bearing medical information within the holding body, wherein the radio frequency communication circuit further transmits a fourth electromagnetic field that can be used to identify at least one medium bearing medical information within the holding body to the remote radio frequency read write device.

2. The holder of claim 1 wherein the radio frequency communication circuit is powered remotely by said first electromagnetic field.

3. The holder of claim 1, wherein the radio frequency communication circuit is powered by a power source within said holding body.

4. The holder of claim 1 having the capability of communicating over a distance of more than five feet.

5. The holder of claim 1 having an antenna formed as part of the holding body.

6. The holder of claim 1, having the antenna and radio frequency communication circuit formed as part of a communication medium that is removable from the holder body.

7. The holder of claim 1, further comprising a memory adapted to receive and store log data indicating mediums held by the holding body.

8. The holder of claim 7, wherein radio frequency communication circuit maintains the log data of the mediums held by the holding body in the memory.

9. The holder of claim 7, wherein the remotely located radio frequency read/write device maintains log data of at least one medium held by the holding body in the memory.

10. The holder of claim 7, wherein the memory is adapted to receive data indicating at least one viewer who has accessed at least one medium held within the holder.

11. The holder of claim 7, wherein the radio frequency communication circuit compares information identifying at least one medium within the holding body against a stored listing of at least one medium.

12. A medium management system, comprising:

at least one medium bearing medical information, with each at least one medium having an associated radio frequency transponder;

a holder for holding at least one medium, the holder having a holding body to receive and hold at least one medium, an antenna coupled to a radio frequency communication circuit operable to sense a first electromagnetic field transmitted by a remote radio frequency read write device, generate a near-distance second electromagnetic field in the holding body with the second electromagnetic field adapted to cause the radio frequency transponders associated with at least one medium held by the holding body to respond with near-distance electromagnetic fields that can be used to identify at least one medium within the holding body, wherein the radio frequency communication circuit further transmits electromagnetic fields that can be used to identify at least one medium bearing medical information within the holding body to the remote radio frequency read write device.

13. The medium management system of claim 12, wherein said remote radio frequency read/write device is positioned at an access point to an enclosed area and wherein the remote radio frequency read write device generates a first electromagnetic field to detect holder identification data for holders entering the enclosed area and to identify at least one mediums in the detected holders.

14. The medium management system of claim 13, wherein the remote radio frequency read write device stores holder identification data and data that identifies the at least one medium entering the enclosed area in such detected holders.

15. The medium management system of claim 13, wherein the remote radio frequency read/write device generates a first electromagnetic field to detect holder identification data for holders exiting the enclosed area and to identify at least one medium in the detected holders.

16. The medium management system of claim 15, wherein the remote radio frequency read write device generates an alarm when a holder is detected leaving the enclosed area that does not contain the same set of at least one mediums that the holder held upon entering the enclosed area.

17. The medium management system of claim 15, wherein a carrier of the holder has an radio frequency transponder and the remote radio frequency read write device stores information in a memory that identifies the carrier of each holder.

18. The medium management system of claim 15 wherein the medium management system comprises at least one display device for facilitating reading of information recorded in the radio frequency transponder associate with each of at least one medium, wherein said remote radio frequency read write device associates each at least one medium with a holder and disables said display devices unless at least one medium associated with the holder is within a controlled access area.

19. The medium management system of claim 12, wherein the radio frequency transponders are capable of communicating over a distance of less than one meter and wherein the radio frequency communication circuit can communicate with the remote radio frequency read write device over a distance of more than one meter.

20. The communication circuit of claim 12 wherein the near-distance is between 0.1 cm and 50 cm.

* * * * *